Oct. 21, 1952

W. E. HEISE 2,614,403

MOLD FREEZING APPARATUS

Filed Oct. 18, 1949

INVENTOR.
WALTER E. HEISE
BY Bodell & Thompson
ATTORNEYS

Oct. 21, 1952 — W. E. HEISE — 2,614,403

MOLD FREEZING APPARATUS

Filed Oct. 18, 1949 — 3 Sheets-Sheet 2

INVENTOR.
WALTER E. HEISE
BY Bodell & Thompson
ATTORNEYS

Oct. 21, 1952 W. E. HEISE 2,614,403
MOLD FREEZING APPARATUS
Filed Oct. 18, 1949 3 Sheets-Sheet 3

INVENTOR.
WALTER E. HEISE
BY Bodell & Thompson
ATTORNEYS

Patented Oct. 21, 1952

2,614,403

UNITED STATES PATENT OFFICE 2,614,403

MOLD FREEZING APPARATUS

Walter E. Heise, Syracuse, N. Y.

Application October 18, 1949, Serial No. 121,945

2 Claims. (Cl. 62—160)

This invention relates to apparatus for refrigerating confection molds to effect freezing of the contents of the molds.

More particularly the invention relates to a freezing apparatus for molds used in connection with the manufacture of confections usually frozen onto a stick which serves as a handle for holding the confection while it is being eaten.

The molds are usually of the multi-compartment type wherein several articles of confection, for example 24, are molded and frozen in one mold. After the material is placed in the compartments of the molds, the molds are partially submerged in a liquid cooling medium contained in a tank. The molds are supported by guide rails, and a procession of the molds is moved slowly through the tank during which time the cooling medium is circulated, or moved lengthwise of the tank and procession of molds by an agitating screw or circulating pump.

With this arrangement, the cooling medium encounters considerable resistance from the molds whereby the medium can not be rapidly circulated, nor can it be brought into contact with the undersurface of the molds at a uniform low temperature. Also, due to the resistance offered by the molds to the flow of the cooling medium lengthwise of the tank, a considerable head of the cooling medium is maintained at the end of the tank at which the cooling medium enters, with the result that the tank unit has to be inclined at a considerable angle in order to maintain a level of the cooling medium about the molds.

Because of the manufacturing operation, it is desirable to leave molds in the tank positioned on the guide rail at the close of the day's work. With apparatus described and now in use, it is necessary to keep the circulating pump running continuously. Otherwise, because of the inclination of the tank, the molds at the discharge end of the tank will become submerged because of the inclination of the tank and the confections in those molds will be contaminated by the cooling medium.

This invention has as an object a freezing apparatus involving a structure by which the refrigerated cooling medium is directed vertically and uniformly against the bottom area of all the molds, the medium being refrigerated during its movement toward the molds and also while it is flowing in a downward direction away from the molds on its return to the circulating means, the arrangement being such that the tank can be operated in level position, all whereby the material in the molds is frozen in much less time and in a more uniform manner.

The invention consists in the novel features and in the combinations and constructions hereinafter set forth and claimed.

In describing this invention, reference is had to the accompanying drawings in which like characters designate corresponding parts in all the views.

Figure 1:
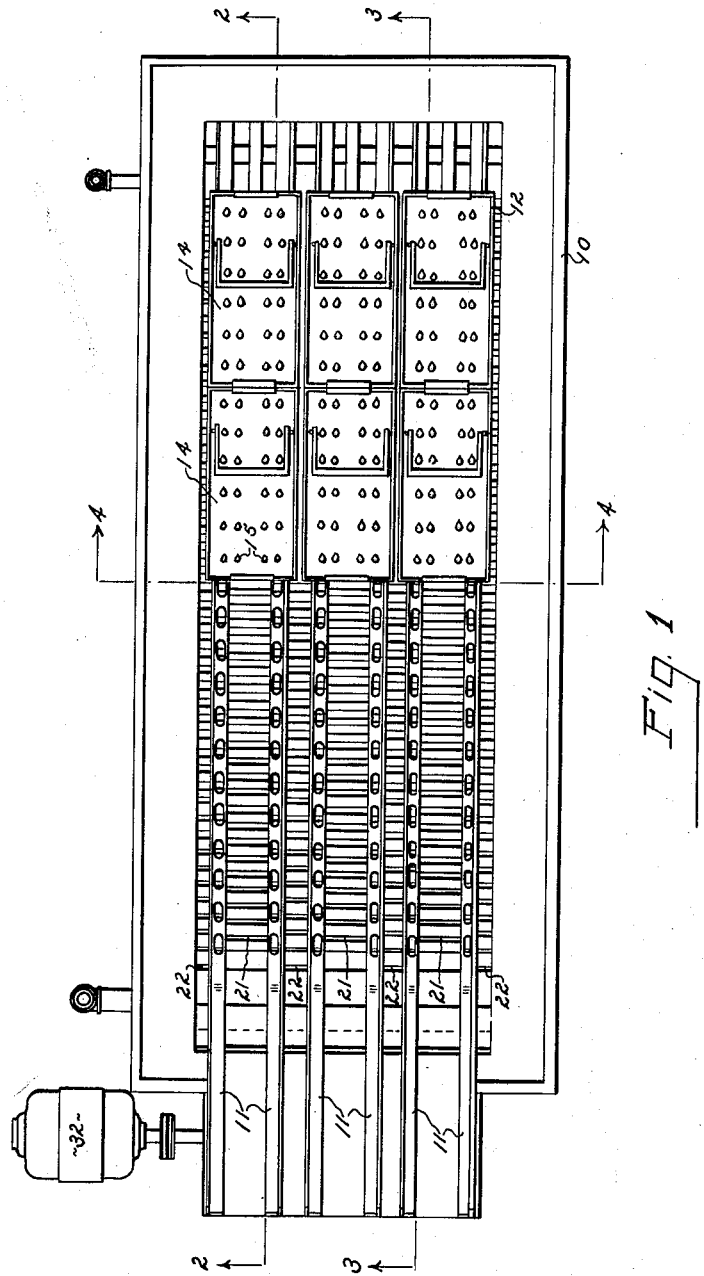
Figure 1 is a top plan view of a freezing apparatus embodying my invention.

The apparatus consists of an elongated tank 10 rectangular in cross section and formed with a plurality of mold guide rails 11 extending lengthwise of the tank. The rails 11 are positioned downwardly from the top edge of the tank appreciably the height of the molds 12 and are inclined upwardly as at 13 adjacent one end of the tank. This arrangement is more or less conventional in apparatus of this kind.

The molds 12 are formed of sheet metal and usually contain 24 pockets, in each of which a confection article is formed. A plate 14 is positioned on the top of each of the molds and is provided with mechanism for holding sticks 15 which depend from the plates in each of the pockets in the mold. These pockets are filled with edible material, such as ice-cream, the plates 14 attached to the molds with a stick depending in each pocket. The molds are then subjected to a freezing medium to freeze the material therein, the stick serving as a handle for the confection while it is being eaten.

The molds with the contents therein are manually, or by mechanical means, lowered into the cooling medium on the guide rails at the right end of the freezing tank, as shown in the drawings. The molds are intermittently pushed forward the length of the tank as each new mold is placed on the guide rails. The molds remain on the guide rails a sufficient length of time to properly hard freeze the contents in the pockets of the molds.

Heretofore, it has been customary to pump the liquid cooling medium in a direction lengthwise of the tank around the molds, as previously stated.

In my construction, the tank is formed with a plurality of vertical partitions 20 which form alternate up-flow compartments 21 and down-flow compartments 22 respectively. In each of these compartments there are arranged a plurality of refrigerating coils 24. The compartments extend lengthwise of the tank and the up-flow compartments 21 are positioned to discharge cooling medium upwardly against the bottom area of the molds 12. In each of the compartments 21, 22, there are a plurality of fins 26 mounted in heat exchanging relation upon the refrigerating coils 24. The portion of the fins attached to each pipe of the coils 24 extends in angular relation to the axis of the pipe and to that portion of the fin attached to the next contiguous pipe, thereby forming a vertical tortuous path through which the liquid cooling medium travels in its upward and downward flow through the compartments 21, 22.

The up-flow compartments are provided with bottom walls 28 spaced upwardly from the bottom of the tank 10. The compartments 21 are connected at the forward end of the tank through a passage 30 to the discharge outlet of a circulating means 31 operated by a motor 32.

The down-flow compartments 22 extend to the bottom of the tank and are connected through a passage 35 to the inlet side of the pump 31.

Figure 2:
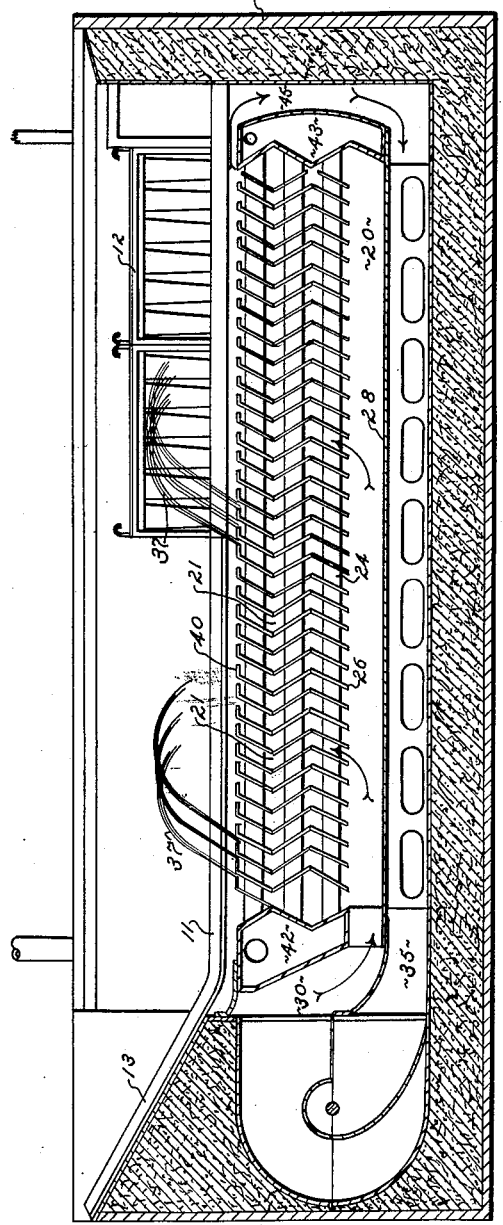
Figure 2 is a view taken on line 2—2, Figure 1.
Figures 3, 4:
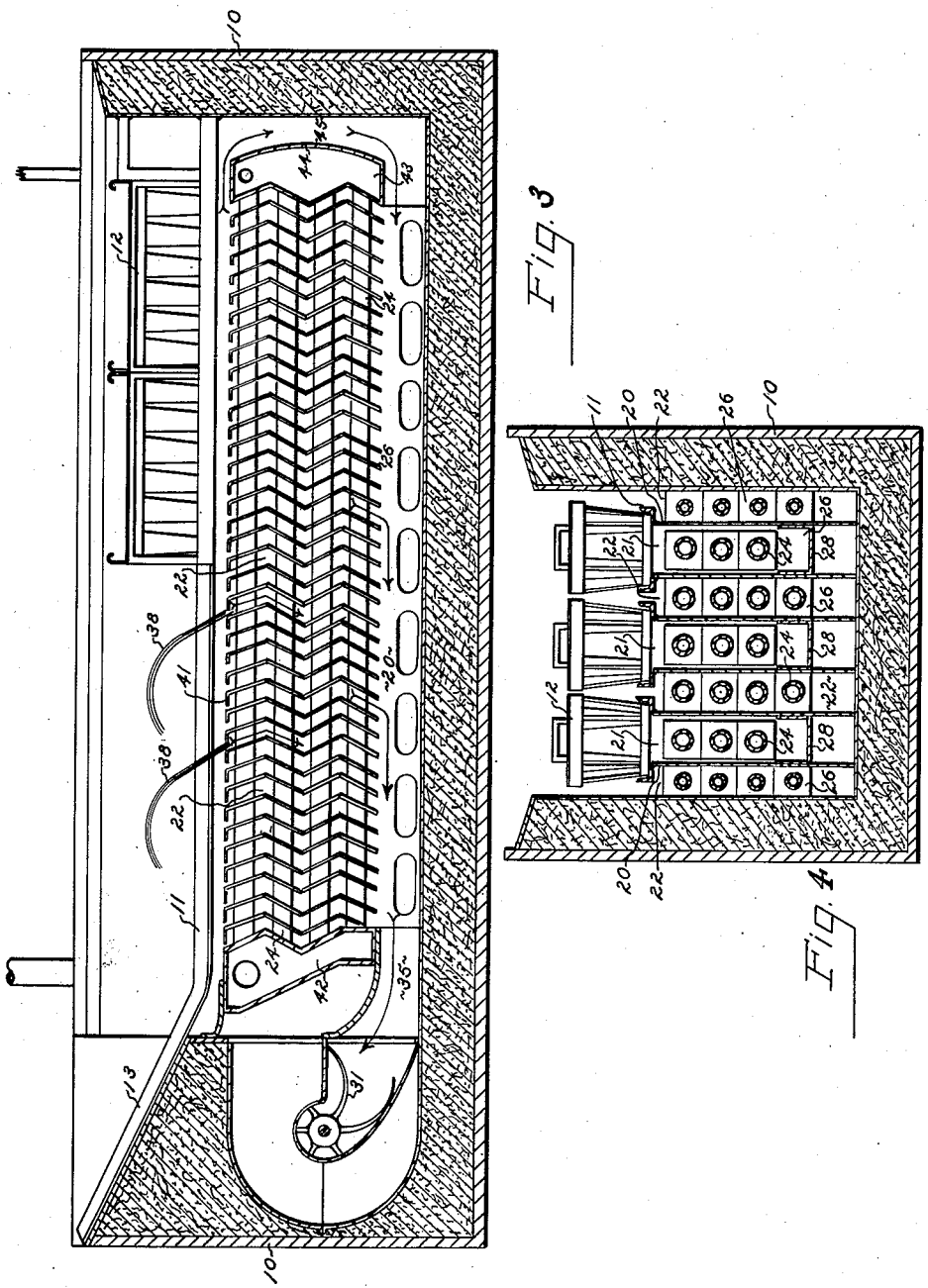
Figure 3 is a view taken on line 3—3, Figure 1.
Figure 4 is a view taken on line 4—4, Figure 1.

When the pump is in operation, the liquid cooling medium is forced into the compartments 21 and upwardly about the refrigerating coils and fins in those compartments and discharged, as indicated at 37, Figure 2, upwardly against the bottom area of the pockets in the molds 12. The refrigerant flows downwardly through the compartments 22, as indicated at 38, Figure 3. In this way, the cooling medium is circulated in heat exchanging relation to the refrigerating coils 24 and is discharged upwardly against the bottom area of all of the molds on the guide rails 11, whereby all of these molds are subjected to a uniform temperature, with the result that the freezing of the confection material is equalized and takes place much more rapidly than in refrigerating apparatus of this type previously used.

After the cooling medium has been discharged upwardly against the bottom of the molds and has absorbed heat therefrom, it is cooled during its downward movement through the compartments 22 which are also provided with the refrigerating coils 24. The fins 26 arranged in the up-flow discharge compartments 21 are formed at their upper ends with horizontally extending flanges 40. The length of the flanges 40 progressively increases towards the circulating means 31 to provide progressively smaller discharge openings toward that end of the tank, see Figure 2. The pressure on the cooling medium is somewhat higher in the passage 30 than at the right end of the tank. Accordingly, by having the discharge openings formed by the flanges 40 smaller at the end of the tank near the discharge of the circulating pump, a more uniform discharge of the cooling liquid is obtained against all of the molds in the procession on the guide rails 11. In like manner, the flanges 41 formed on the upper ends of the fins 26 arranged in the down-flow or return compartments are formed so as to progressively increase the return openings toward the right end of the tank, see Figure 3.

The refrigerating coils 24 are attached at one end to a header 42 and at their opposite ends to a header 43, the outer wall 44 of which forms, in conjunction with the adjacent end of the tank, a passage 45 to permit the return of any excess cooling medium to the passage 35 which does not return through the down-flow compartments 22.

With this arrangement including the progressive variation in the fin structure providing the discharge openings from the up-flow compartments and the return openings in the down-flow compartments, the cooling medium is maintained at a predetermined level, whereby the tank 10 may be mounted level and the molds 12 may be allowed to remain on the guide rails 11 even though the circulating pump 31 is stopped.

Because of the uniform refrigeration of the cooling medium and its rapid circulation about the coils 24 and the fins 26, the apparatus may be constructed considerably shorter in length than those now in use and properly freeze the same number of molds in less time.

What I claim is:

1. A freezing apparatus for confection molds comprising a tank containing a liquid cooling medium, a guide rail extending lengthwise of the tank for supporting a procession of molds, said tank being formed with an up-flow compartment arranged centrally below said guide rail and extending lengthwise thereof, a down-flow compartment extending adjacent each side of said up-flow compartment, a series of refrigerating tubes extending lengthwise in said up-flow and down-flow compartments, a series of fins arranged on said tubes, said fins being spaced apart in a direction lengthwise of the tubes and forming vertically arranged tortuous passages for the flow of the cooling medium, the fins in said up-flow compartment having laterally extending flanges at their upper ends to restrict the discharge area of said passages, and a circulating means having a discharge connected to said up-flow compartment and a suction connected to said down-flow compartments.

2. A freezing apparatus for confection molds comprising a tank containing a liquid cooling medium, a guide rail extending lengthwise of the tank for supporting a procession of moulds, said tank being formed with an up-flow compartment arranged centrally below said guide rail and extending lengthwise thereof, a down-flow compartment extending adjacent each side of said up-flow compartment, a series of refrigerating tubes extending lengthwise in said up-flow and down-flow compartments, a series of fins arranged on said tubes, said fins being spaced apart in a direction lengthwise of the tubes and forming vertically arranged tortuous passages for the flow of the cooling medium, a circulating pump arranged at one end of said tank and having a discharge connected to said up-flow compartment and a suction connected to said down-flow compartments, the upper ends of said vertically arranged passages increasing progressively in area from said circulating pump toward the opposite end of the tank.

WALTER E. HEISE.

REFERENCES CITED

The following references are of record in the file of this patent:

UNITED STATES PATENTS

| Number | Name | Date |
|---|---|---|
| 1,689,965 | Petersen | Oct. 30, 1928 |
| 2,117,505 | Reinhardt | May 17, 1938 |
| 2,213,206 | Culver | Sept. 3, 1940 |
| 2,347,642 | Reinhardt | May 2, 1944 |